(12) United States Patent
Shamsaasef et al.

(10) Patent No.: US 12,007,908 B2
(45) Date of Patent: Jun. 11, 2024

(54) METHOD AND APPARATUS TO DYNAMICALLY ENCODE DATA AT RUNTIME

(71) Applicant: ARRIS Enterprises LLC, Suwanee, GA (US)

(72) Inventors: Rafie Shamsaasef, San Diego, CA (US); Lex Aaron Anderson, Auckland (NZ)

(73) Assignee: ARRIS Enterprises LLC, Suwanee, GA (US)

( * ) Notice: Subject to any disclaimer, the term of this patent is extended or adjusted under 35 U.S.C. 154(b) by 8 days.

(21) Appl. No.: 15/841,743

(22) Filed: Dec. 14, 2017

(65) Prior Publication Data
US 2019/0188157 A1 Jun. 20, 2019

(51) Int. Cl.
| | |
|---|---|
| *G06F 21/00* | (2013.01) |
| *G06F 8/41* | (2018.01) |
| *G06F 9/54* | (2006.01) |
| *G06F 12/14* | (2006.01) |
| *G06F 21/14* | (2013.01) |

(Continued)

(52) U.S. Cl.
CPC .......... *G06F 12/1408* (2013.01); *G06F 8/423* (2013.01); *G06F 9/544* (2013.01); *G06F 21/14* (2013.01); *G06F 21/54* (2013.01); *G06F 21/60* (2013.01); *H04L 9/0631* (2013.01);
(Continued)

(58) Field of Classification Search
CPC ...... G06F 12/1408; G06F 21/14; G06F 21/54; G06F 21/60; G06F 2221/2125; H04L 63/0428; H04L 2209/16
See application file for complete search history.

(56) References Cited

U.S. PATENT DOCUMENTS 9,471,852 B1 * 10/2016 Feris .................... G06K 9/6269
9,626,359 B1 * 4/2017 Sun ....................... G06F 21/125
(Continued)

FOREIGN PATENT DOCUMENTS

WO   2011/116446 A1   9/2011

OTHER PUBLICATIONS

Yasin, A., et al, "Dynamic Multi Levels Java Code Obfuscation Technique (DMLJCOT)", International Journal of Computer Science and Security (IJCSS), vol. (10) : Issue (4) : 2016.
(Continued)

*Primary Examiner* — Michael M Lee
(74) *Attorney, Agent, or Firm* — Chernoff, Vilhauer, McClung & Stenzel, LLP

(57) ABSTRACT

A method is provided to dynamically encode data at runtime with a tagged data element in a program associated with an obfuscation algorithm randomly selected during runtime. Instructions for invoking the obfuscation algorithm are generated when a compiler encounters the tagged variable in the source code. At runtime, unencoded data is encoded by the obfuscation algorithm when the unencoded data is copied to the tagged data element; encoded data is re-encoded by the obfuscation algorithm when the encoded data is copied from a differently tagged data element to the tagged data element, wherein the differently tagged data element is associated with a different obfuscation algorithm; and encoded data is decoded by the obfuscation algorithm when the encoded data is copied from the tagged data element to an untagged data element.

16 Claims, 5 Drawing Sheets

(51) Int. Cl.
    *G06F 21/54*     (2013.01)
    *G06F 21/60*     (2013.01)
    *H04L 9/06*     (2006.01)
    *H04L 65/75*     (2022.01)
    *H04L 9/40*     (2022.01)

(52) U.S. Cl.
    CPC ...... H04L 65/75 (2022.05); *G06F 2221/2125* (2013.01); *H04L 63/0428* (2013.01); *H04L 2209/16* (2013.01)

(56) References Cited

U.S. PATENT DOCUMENTS

| | | | |
|---|---|---|---|
| 2003/0163718 A1* | 8/2003 | Johnson | G06F 21/79 713/193 |
| 2004/0003278 A1 | 1/2004 | Chen et al. | |
| 2005/0246554 A1* | 11/2005 | Batson | G06F 21/125 713/194 |
| 2010/0262839 A1* | 10/2010 | Eker | G06F 21/52 717/106 |
| 2013/0014275 A1* | 1/2013 | Goodes | G06F 21/14 726/26 |
| 2014/0115292 A1* | 4/2014 | McLachlan | G06F 12/02 711/170 |
| 2014/0165208 A1* | 6/2014 | Chevallier-Mames | G06F 21/14 726/26 |
| 2014/0237622 A1* | 8/2014 | Chang | G06F 21/54 726/27 |
| 2016/0218872 A1* | 7/2016 | Anderson | H04L 9/065 |
| 2017/0351847 A1* | 12/2017 | Zvenigorodsky | G06F 8/423 |
| 2018/0157808 A1* | 6/2018 | Jeon | G06F 21/125 |

OTHER PUBLICATIONS

Xu, D., et al, "Generalized Dynamic Opaque Predicates: A New Control Flow Obfuscation Method", International Conference on Information Security ISC 2016: Information Security, Aug. 2016.
PCT International Search Report & Written Opinion, RE: Application No. PCT/US2018/062219, dated Jan. 29, 2019.

* cited by examiner

METHOD AND APPARATUS TO DYNAMICALLY ENCODE DATA AT RUNTIME

BACKGROUND

Field of the Invention

The present disclosure relates to a method and apparatus to dynamically encode data at runtime.

Description of the Related Art

Digital Rights Management (DRM) and other security systems are vulnerable to tampering attacks aimed at defeating their security measures. The goal of integrity protection is to increase the cost of such attacks.

For example, in a streaming media delivery system, a media server delivers media content in encrypted media streams to media players for subscribers (end users) who wish to view the media content. The media player receives the encrypted media stream as an input data flow and has program code embodying algorithms or functionality for decrypting the media stream to generate decrypted output data flows embodying the media content that can be delivered to an audiovisual system for the end user to view the media content.

The media stream is encrypted to prevent unauthorized parties (i.e. nonsubscribers) from being able to view the media content, even if they can intercept the media stream prior to arriving at the media player. Therefore, the encryption of media streams provides a degree of protection against an adversary which intercepts the media stream. If they do so, they cannot access the media content, without a decryption key and algorithm.

However, once the media stream has reached the subscriber's media player, the media player and/or audio-visual system can be compromised to access the decrypted output data flows and/or examine and reverse engineer the media player's program code or functionality. This enables the media content to be extracted, stored and used in an unauthorized manner.

The same type of attack and therefore protection requirement exist for other systems of use entitlement, use authorization, content rights and usage rights. In general, any sensitive data that is used in the clear, even for a short period of time in memory, is vulnerable to such attacks and requires such protection.

What is needed, then, are solutions that obfuscate the data flows within a program, or between the program and other components, to make it more difficult for an adversary to examine and reverse engineer the program code functionality and/or access the data flows.

SUMMARY

To address the requirements described above, the invention discloses a method and apparatus to dynamically encode data at runtime.

At least one data element in the program is tagged with an encoding identifier in the source code of the program, wherein the tagged data element is associated with an obfuscation algorithm randomly selected during runtime of the program for encoding, decoding or re-encoding data stored in the tagged data element. Instructions for invoking the obfuscation algorithm associated with the tagged data element are generated when a compiler encounters the tagged data element in the source code.

During runtime, unencoded data is encoded by the obfuscation algorithm when the unencoded data is copied to the tagged data element; encoded data is re-encoded by the obfuscation algorithm when the encoded data is copied from a differently tagged data element to the tagged data element; or encoded data is decoded by the obfuscation algorithm when the encoded data is copied from the tagged data element to an untagged data element.

The obfuscation algorithm is randomly selected at runtime from a pool of obfuscation algorithms injected into the program at build-time, wherein the obfuscation algorithms are injected into the program at randomly selected locations. The obfuscation algorithms in the pool are themselves randomly selected from a library of obfuscation algorithms.

The features, functions, and advantages that have been discussed can be achieved independently in various embodiments of the present invention or may be combined in yet other embodiments, further details of which can be seen with reference to the following description and drawings.

DRAWINGS

Referring now to the drawings in which like reference numbers represent corresponding parts throughout:

DESCRIPTION

Figure 1:
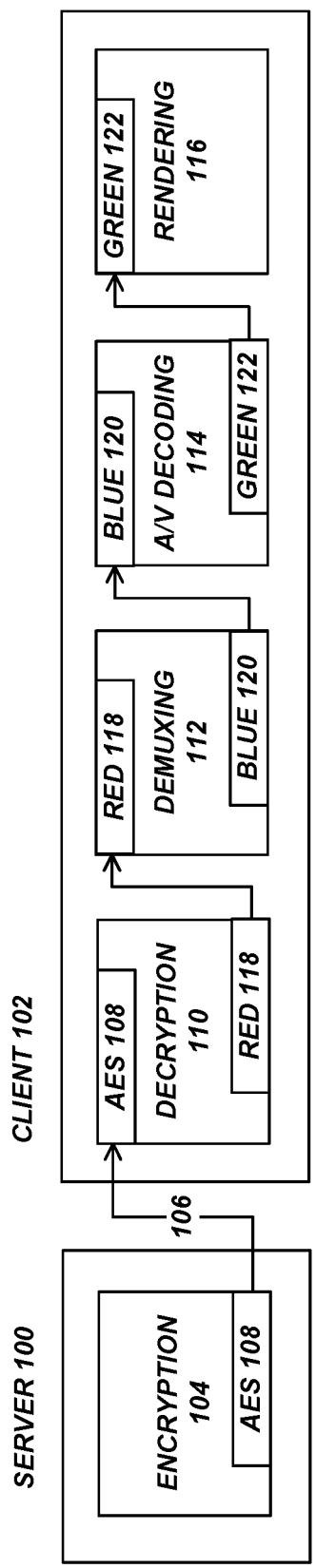
FIG. 1 shows a media streaming system comprising a server communicating with a client, according to one embodiment of the present invention.

In the following description, reference is made to the accompanying drawings which form a part hereof, and which is shown, by way of illustration, several embodiments. It is understood that other embodiments may be utilized and structural changes may be made without departing from the scope of the present disclosure.

Overview

The data-flow of a program represents the sequence of transformations that map a program's input data to its output data. Data obfuscation systems are used to encode the data-flow to protect it from being intercepted.

Static obfuscation refers to obfuscated programs that remain fixed at runtime, while dynamic obfuscators refers to obfuscated programs that are altered continuously at runtime, keeping them in constant flux. In these contexts, obfuscation techniques may include control-flow obfuscations, data-flow obfuscations, and other techniques.

There is an opportunity to provide a form of dynamic data encoding to improve runtime data security that can exist stand-alone and in conjunction with the existing data obfuscation methods. The present invention uses randomly selected runtime algorithms that dynamically randomize the way data is encoded to add protection against sensitive data being read or altered at runtime.

A pool of data-encoding algorithms are randomly selected from a library of data-encoding algorithms, and the data-encoding algorithms in the pool are injected at random intervals into protected applications at build-time, wherein the data-encoding algorithms are randomly selected at runtime to encode data in developer-tagged variables. Each time these tagged variables are accessed, their associated data-encoding algorithms are utilized, resulting in dynamic data encoding.

The aim of dynamic data encoding is to achieve a greater level of data security through increased diversity. Dynamically selecting from a pool of data-encoding algorithms at runtime protects against attacks that compromise any single algorithm.

The implementation of this invention includes the following steps:
1. A developer tags variables to be dynamically encoded in the source code of an application to be protected.
2. A pool of randomly selected data-encoding algorithms is injected at random intervals into the protected application during compilation. These algorithms are used to perform dynamic data encoding, decoding and re-encoding operations at runtime.
3. Dynamic encoding occurs when unencoded data is copied to tagged variables.
4. Dynamic re-encoding occurs when encoded data is copied between differently tagged variables. Specifically, transforms are provided to convert encoded data into other encoded forms for compatibility with existing data obfuscation systems.
5. Dynamic decoding occurs when encoded data is copied from tagged variables to untagged variables.

There are a number of differences between this invention and prior solutions:
  Simple tagging mechanisms are provided to identify variables in C/C++ source code that are to participate in dynamic data encoding.
  Lightweight dynamic data encoding functions are injected randomly at build-time to operate on tagged variables at runtime.
  Data encoding algorithms are selected randomly at runtime each time the encoded data is accessed.
  Diversification of data encoding algorithms to be used at runtime.
  A decentralized design is chosen to avoid single points of failure.
  Compatibility with other encoding methods and obfuscation modules.
  These and other aspects of this invention are described in more detail below.

Media Streaming System

FIG. 1 shows a media streaming system comprising a server 100 communicating with a client 102, according to one embodiment of the present invention. The server 100 (such as a media server, web server or the like) typically includes a processor that performs encryption 104 (and/or compression) to generate an encrypted media stream 106, wherein the encryption 104 conforms to, for example, the Advanced Encryption Standard (AES) 108, or some other encryption and/or compression method. The client 102 (such as a media player, web browser or the like) includes a processor that receives the media stream 106 and performs decryption 110 (and/or decompression) on the media stream 106, wherein the decryption 110 also conforms to, for example, the Advanced Encryption Standard (AES) 108, or some other encryption and/or compression method. Thereafter, further processing may be performed on the media stream 106 by the client 102, such as demuxing 112, audio/video (A/V) decoding 114, and/or rendering 116, as well as other functions not shown.

If an unauthorized party intercepts the media stream 106, they cannot easily retrieve the contents thereof unless they have the keys used for the decryption 110. However, if an unauthorized party tampers with the client 102, they may be able to access the contents of the media stream 106 in clear text form by reverse engineering the decryption 110, demuxing 112, A/V decoding 114, and/or rendering 116 processing, and/or by examining data-flows between or within the decryption 110, demuxing 112, A/V decoding 114, and/or rendering 116 processing.

To avoid this result, the data-flows within and between the decryption 110, demuxing 112, A/V decoding 114, and/or rendering 116 processing, are obfuscated using one or more obfuscation algorithms labeled in FIG. 1 by identifiers "Red" 118, "Blue" 120 and "Green" 122. One or more obfuscation algorithms are randomly injected into the client 102 at build-time and then the obfuscation algorithms are randomly selected by the client 102 at runtime to be associated with the encoding identifiers "Red" 118, "Blue" 120 and "Green" 122.

In this context, the phrase "obfuscation algorithms" are data-encoding algorithms that encompass functions for encoding, decoding and/or re-encoding the data-flows. In one embodiment, these obfuscation algorithms comprise bijection encoding techniques, including composite bijection encoding techniques, although other techniques may be used as well.

Consequently, this invention provides a dynamic aspect to data-flow obfuscation. Specifically, runtime algorithms are defined that dynamically randomize the way a program encodes data to add protection against sensitive data being read or altered at runtime. The aim of dynamic data encoding is to achieve a greater level of data security through increased diversity. Dynamically and randomly selecting obfuscation algorithms at runtime protects against attacks that compromise any single algorithm.

Examples of systems that may implement such functionality include:
  Streaming media delivery systems that deliver encrypted media content, which is received by a media player that decrypts the media stream and outputs the media content.
  Document management systems, where documents are shared between authorized parties.
  Media or software license management, where verification of licenses is required.
  Media players in a web browser or other untrusted platform.
  More generally, a data-flow receiver that receives a stream of encrypted data and decrypts that stream to provide unencrypted output, or any system on an untrusted platform where the data-flow needs to be obfuscated to hide the functionality from untrusted parties.

Program Development

Figure 2:
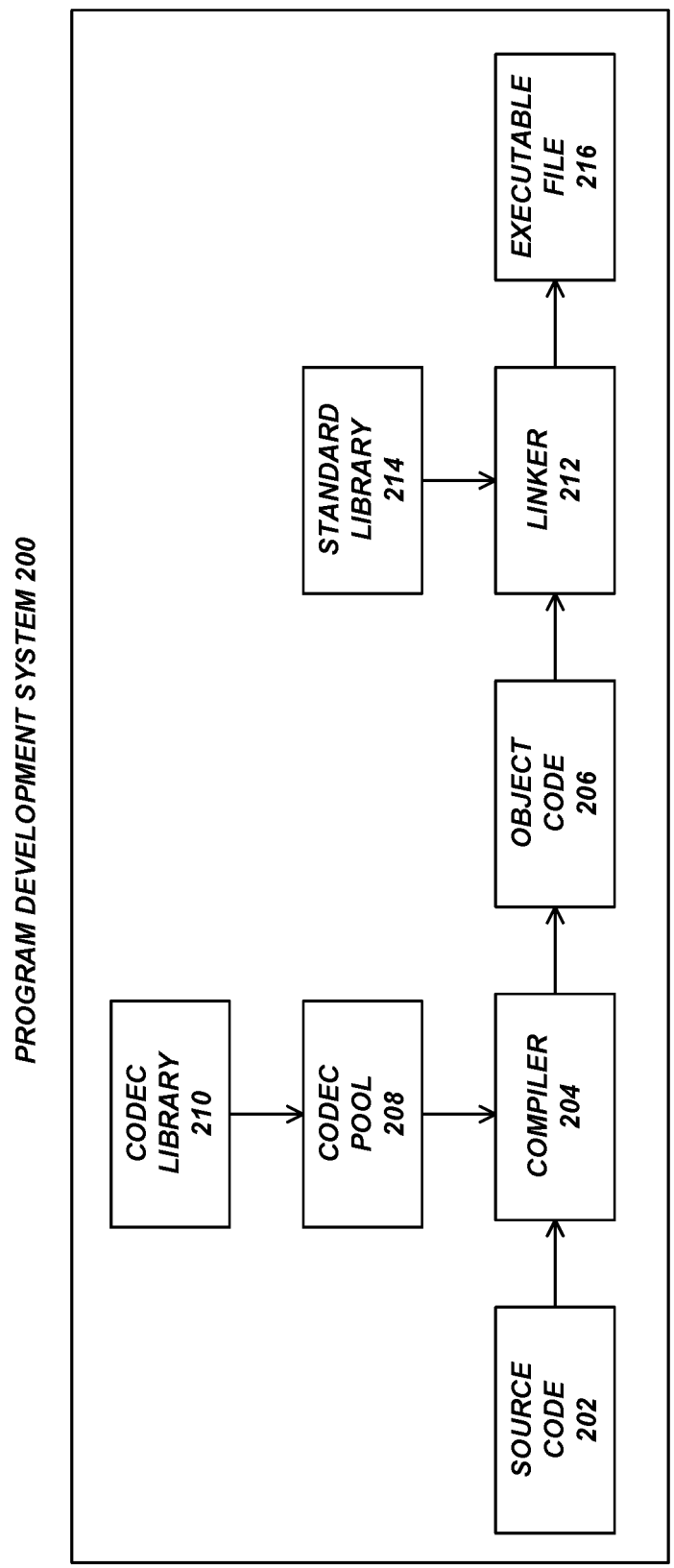
FIG. 2 is a diagram of the steps that may be performed to compile, build, link and run a protected program, according to one embodiment of the present invention.

FIG. 2 is a diagram of the steps that may be performed to compile, build, link and run a protected program, such as the client 102, or one of the modules within the client 102, such as the decryption 110, demuxing 112, A/V decoding 114, and/or rendering 116 modules. In one embodiment, these steps are performed by a program development system 200.

One or more files of source code 202 are provided to a compiler 204 that performs build-time operations to generate one or more files of object code 206 that are machine (or intermediate) language versions of the source code 202. The compiler 204 injects a codec pool 208 of one or more obfuscation algorithms into the object code 206, wherein codec pool 208 is randomly selected from a codec library 210 of obfuscation algorithms. A linker 212 links the object code 206, along with one or more standard libraries 214, to generate one or more executable files 216. The executable file 216 may comprise the client 102, or may comprise one or more of the modules within the client 102, such as the decryption 110, demuxing 112, A/V decoding 114, and/or rendering 116 processing.

In one embodiment, a developer tags data elements in the source code 202 that are to participate in the dynamic data encoding, wherein the tags comprise compiler 204 directives. Different tags are typically associated with different obfuscation algorithms, although different tags may be associated with the same obfuscation algorithms.

When the compiler 204 encounters these tagged data elements in the source code 202, it generates the necessary instructions in the object code 206 for invoking the obfuscation algorithms associated with the tagged data elements. The instructions invoke encoding functions of the obfuscation algorithms when unencoded data is copied to the tagged data elements; the instructions invoke re-encoding functions of the obfuscation algorithms when encoded data is copied between differently tagged data elements; and the instructions invoke decoding functions of the obfuscation algorithms when encoded data is copied from tagged data elements to untagged data elements.

The compiler 204 randomly selects the obfuscation algorithms from the codec library 210 for inclusion into the codec pool 208. The obfuscation algorithms in the codec pool 208 are injected at randomly selected locations or intervals in the object code 204. The random selection in both instances may be performed using a seeded random number generator, a background thread, or using some other strategy.

At runtime, the instructions generated for the different tagged data elements are associated with the obfuscation algorithms injected into the object code 206. The obfuscation algorithms are randomly selected for association with the different tagged data elements, again, wherein the random selection may be performed using a seeded random number generator, a background thread, or using some other strategy. This association may be performed using a jump table, or a hashing function, or some other method. Consequently, at every runtime, different obfuscation algorithms may be used with the tagged data elements. Therefore, even if the attacker is able to understand and decode a data element at one runtime of a program, the attacker will not be able to understand and decode the same data element at the next runtime of the program.

Development Process

Figure 3:
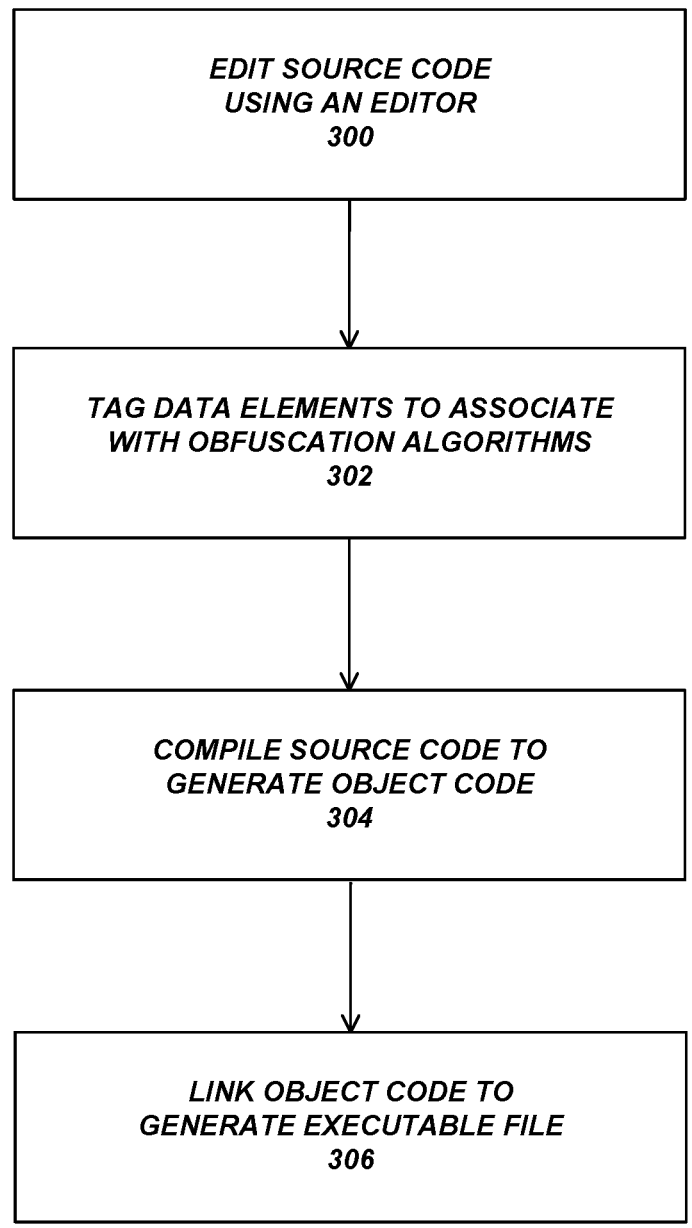
FIG. 3 is a flowchart illustrating steps that may be performed to create a protected executable, according to one embodiment of the present invention.

FIG. 3 is a flowchart that illustrates the steps that may be performed by a processor to create a protected executable file 216.

Block 300 represents the source code 202 being edited by a developer using an editor executed by the processor.

Block 302 represents the developer tagging at least one data element in the source code 202 using the editor, wherein the tagged data element is associated with an obfuscation algorithm randomly selected during runtime of the program for encoding, decoding or re-encoding data stored in the tagged data element.

The data element is tagged with an encoding identifier that identifies a particular obfuscation algorithm to use with the data element at runtime. Encoding identifiers are not only applied to variables, they may also be applied to buffers, data structures, parameters on functions, etc.

The encoding identifiers comprise arbitrary text or strings positioned adjacent the tagged data elements that allow the compiler 204 to identify where encoding, decoding or re-encoding functions should be performed. However, the encoding identifiers are merely labels, and the obfuscation algorithm associated with that encoding identifier is dynamically selected at runtime.

In the example of FIG. 1, the encoding identifiers comprise "Red" 118, "Blue" 120 and "Green" 122, although other encoding identifiers could be used. In the source code 202, the encoding identifiers are designated to the compiler 204 of FIG. 2 by the use of brackets enclosing the encoding identifiers, e.g., "<Red>", "<Blue>" and "<Green>". However, other designations of the encoding identifiers could be used as well.

It is up to the developer to maintain consistency in the use of encoding identifiers in the source code 202. In the example of FIG. 1, the developer must remember that the decryption 110 communicates with the demuxing 112 using "Red" encoding 118; that the demuxing 112 communicates with the A/V decoding 114 using "Blue" encoding 120; and that the A/V decoding 114 communicates with the rendering 116 using "Green" encoding 122.

Block 304 represents the source code 202 being compiled by the compiler 204 executed by the processor, in order to generate machine (or intermediate) language instructions in the object code 206.

In this step, the obfuscation algorithms are randomly selected from the library 210 by the compiler 204 for inclusion in the pool 208. Thereafter, the obfuscation algorithms from the pool 208 are injected into the object code 206 by the compiler 204 at randomly selected locations or intervals in the object code 206.

Also in this step, the instructions for invoking the obfuscation algorithms associated with the tagged data elements are generated in the object code 206. These instructions transfer the flow of execution to the obfuscation algorithms associated with <Red>, <Blue> or <Green> encoding identifiers. In one example, address variables are generated in the object code 206 for the <Red>, <Blue> or <Green> encoding identifiers, and these variables are assigned addresses of the obfuscation algorithms at runtime.

In addition, this step injects bootstrap processing instructions into the object code 206, wherein the bootstrap processing instructions are executed at runtime for randomly assigning the obfuscation algorithms to the <Red>, <Blue> or <Green> encoding identifiers. The bootstrap processing instructions use a seeded random number generator, a background thread, or some other strategy, to perform this random assignment. For example, the bootstrap processing instructions may hash the random numbers generated for use as indexes into a jump table in the object code 206 storing the addresses of the obfuscation algorithms, in order to randomly assign the addresses of the obfuscation algorithms in the jump table to the address variables generated for the <Red>, <Blue> or <Green> encoding identifiers.

Block 306 represents the linker 212 linking the object code 206, along with one or more standard libraries 214, to generate one or more executable files 216.

Runtime Process

Figure 4:
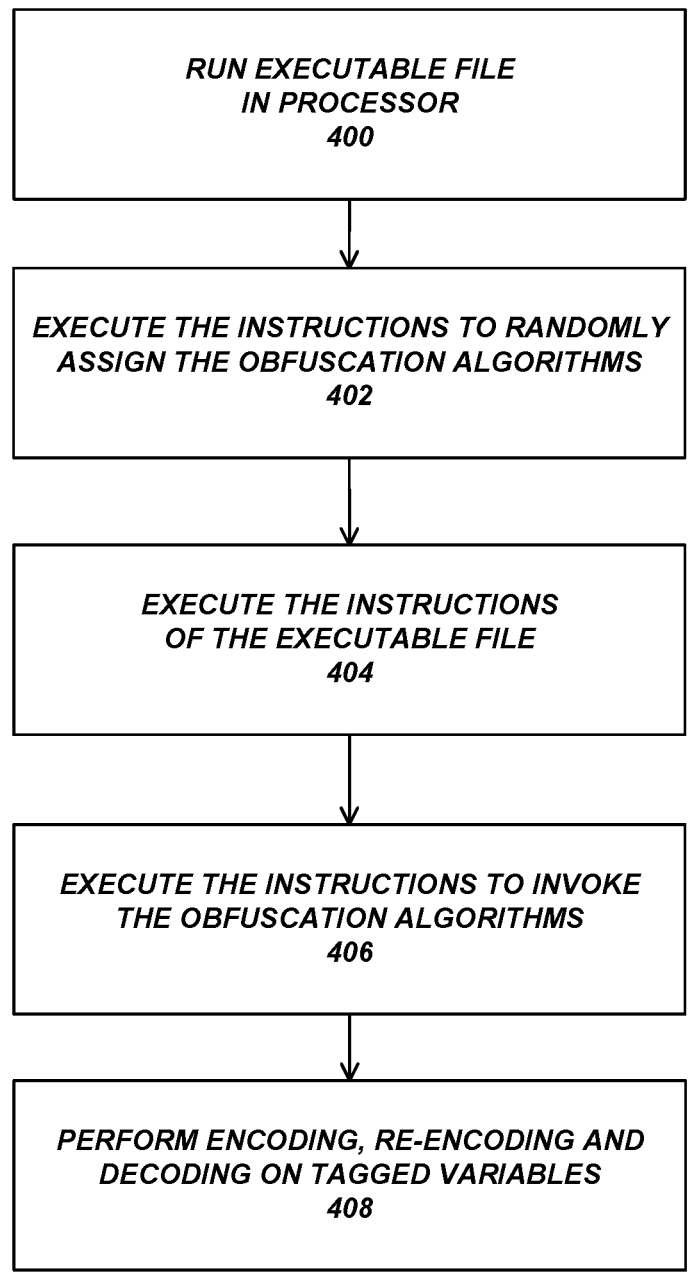
FIG. 4 is a flowchart illustrating steps that may be performed during runtime of a protected executable, according to one embodiment of the present invention.

FIG. 4 is a flowchart illustrating steps that may be performed by a processor during runtime of the protected executable file 216.

Block 400 represents the protected executable file 216 being run by the processor.

Block 402 represents the bootstrap processing instructions from the object code 206 being executed. The bootstrap processing instructions use a seeded random number generator, a background thread, or some other strategy, to randomly assign the obfuscation algorithms to the <Red>, <Blue> or <Green> encoding identifiers.

Block 404 represents the remaining instructions of the protected executable file 216 being executed by the processor.

Block 406 represents the instructions for invoking the obfuscation algorithms associated with the tagged data elements being executed by the processor. These instructions transfer the flow of execution to the obfuscation algorithms associated with <Red>, <Blue> or <Green> encoding identifiers.

Block 408 represents the invoked obfuscation algorithms performing encoding, re-encoding, and/or decoding operations on the tagged data elements. When these instructions are executed, dynamic data encoding occurs when unencoded data is copied to tagged data elements; dynamic data re-encoding occurs when data is copied between differently tagged data elements; and dynamic data decoding occurs when encoded data is copied from tagged data elements to untagged data elements.

Consequently, every runtime of the protected executable file 216 may use different obfuscation algorithms for the tagged data elements, and therefore the encoding, re-encoding and decoding are not deterministic across runtimes.

Alternatives and Modifications

The data-flow obfuscation (DFO) techniques described herein protect data pathways within a program. However, DFO techniques need not be used alone. Other obfuscation techniques can be used with the DFO techniques.

Another obfuscation technique that can be used with the DFO technique comprises DFO-RBE (data-flow obfuscation by randomized branch encoding), which is responsible for static data encoding and secure data chaining. DFO-RBE is used to increase diversity and add resilience against reverse engineering and tampering attacks by producing a randomized program that computes the same function as the original program, yet is unintelligible to an attacker.

Still another obfuscation technique that can be used with the DFO technique comprises DFO-RIO (data-flow obfuscation by randomized input, output and constant encoding), which protects data at runtime with encodings generated at build-time. Static taggings are used to provide secure chaining between systems or modules. Constant data and data that is externally encoded via the DFO-RIO module can also be tagged as dynamic data within one system or module, which will cause the data to be dynamically re-encoded each time it is accessed at runtime. For example, as noted above, the client 102 receives encrypted data from the server 100, and performs static data decoding to decrypt that data; thereafter, dynamic data encoding may be used within the client 102 to prevent access to the decrypted data. This results in the entire data pathway within the client 102 being protected.

Yet another obfuscation technique that can be used with the DFO technique comprises DFO-WBC (data-flow obfuscation by white-box cryptography), which modifies tagged functions so they can operate directly on encoded data. DFO-WBC protects data at runtime by automatic generation of white-box encodings and corresponding transformed functions. Dynamically encoded data can be accessed within the program's domain by the DFO-WBC, without need for the data to be decoded.

As a result, this invention provides a form of dynamic data encoding to improve runtime data security that can exist stand-alone and in conjunction with the other DFO techniques.

Hardware Environment

Figure 5:
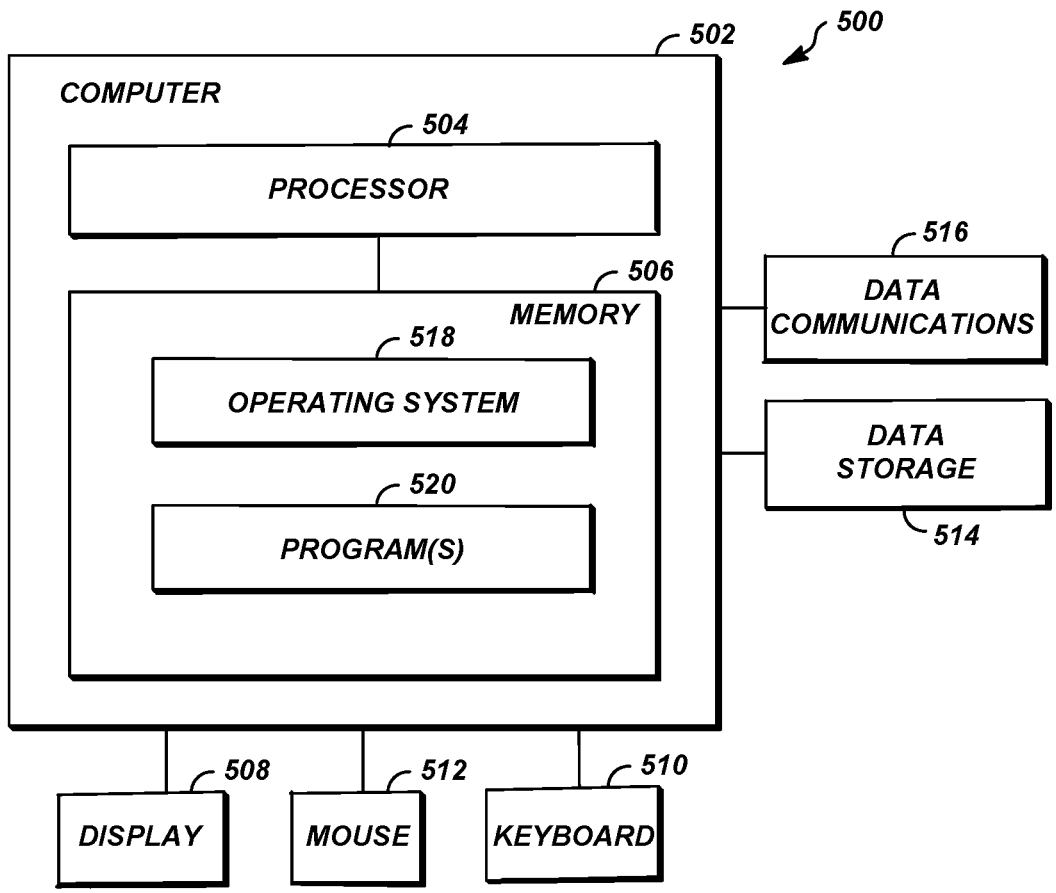
FIG. 5 illustrates an exemplary computer system that could be used to implement processing elements of the present invention.

FIG. 5 illustrates an exemplary computer system 500 that could be used to implement processing elements of the present invention, including the server 100, client 102, and/or program development system 200.

The computer 502 comprises a processor 504 and a memory 506, such as random access memory (RAM). The computer 502 is operatively coupled to a display 508, which presents images such as windows to the user via a graphical user interface. The computer 502 may be coupled to other devices, such as a keyboard 510, mouse 512, data storage 514, data communications 516, etc. Of course, those skilled in the art will recognize that any combination of the above components, or any number of different components, peripherals, and other devices, may be used with the computer 502.

Generally, the computer 502 operates under control of an operating system 518 and one or more program(s) 520 stored in the memory 506. The programs 520 may comprise any of the programs described herein, including the programs executed by the server 100, client 102, program development computer 200, as well as other programs.

Further, the operating system 518 and the programs 520 are comprised of instructions which, when read and executed by the computer 502, causes the computer 502 to perform any of the processing or other operations herein described. Both the operating system 518 and the programs 520 may also be tangibly embodied in memory 506, data storage 514 and/or transferred via data communications devices 516, thereby making a computer program product or article of manufacture. As such, the terms "article of manufacture," "program storage device" and "computer program product" as used herein are intended to encompass the programs 520 when accessible from any computer readable device or media.

Those skilled in the art will recognize many modifications may be made to this configuration without departing from the scope of the present disclosure. For example, those skilled in the art will recognize that any combination of the above components, or any number of different components, peripherals, and other devices, may be used.

Conclusion

This concludes the description of the preferred embodiments of the present disclosure. The foregoing description of the preferred embodiment has been presented for the purposes of illustration and description. It is not intended to be exhaustive or to limit the disclosure to the precise form disclosed. Many modifications and variations are possible in light of the above teachings. It is intended that the scope of rights be limited not by this detailed description, but rather by the claims appended hereto.

What is claimed is:

1. A method comprising:
  randomly selecting at least one dynamic encoding algorithm at runtime during execution of a program by a processor when the processor performs at least one of encoding, decoding and/or re-encoding a data flow of the program, the selecting at runtime made randomly from a pool of encoding algorithms injected into the program at build-time, where the encoding algorithms in the pool each comprise at least one function for encoding, decoding and/or re-encoding the data flow by altering a data value without altering a data type associated with said data value;

wherein the selected at least one dynamic encoding algorithm is associated with at least one tagged data element in the program for encoding, decoding or re-encoding data stored in the tagged data element; and wherein:

unencoded data is encoded by the selected at least one dynamic encoding algorithm when the unencoded data is copied to the tagged data element;

encoded data is re-encoded by the selected at least one dynamic encoding algorithm when the encoded data is copied from a differently tagged data element to the tagged data element; or encoded data is decoded by the selected at least one dynamic encoding algorithm when the encoded data is copied from the tagged data element to an untagged data element.

2. The method of claim 1, wherein the encoding algorithms in the pool are injected into the program at randomly selected locations.

3. The method of claim 1, wherein the encoding algorithms in the pool are randomly selected from a library of obfuscation algorithms.

4. The method of claim 1, wherein the differently tagged data element is associated with a different encoding algorithm.

5. An apparatus comprising:

a processor for executing a program;

wherein at least one dynamic encoding algorithm is randomly selected at runtime during execution of the program when the processor performs at least one of encoding, decoding and/or re-encoding a data flow of the program, the selection at runtime made randomly from a pool of encoding algorithms injected into the program at build-time, where the encoding algorithms in the pool each comprise at least one function for encoding, decoding and/or re-encoding the data-flows by altering a data value without altering a data type associated with said data value;

wherein the selected at least one dynamic encoding algorithm is associated with at least one tagged data element in the program for encoding, decoding or re-encoding data stored in the tagged data element; and wherein:

unencoded data is encoded by the selected at least one dynamic encoding algorithm when the unencoded data is copied to the tagged data element;

encoded data is re-encoded by the selected at least one dynamic encoding algorithm when the encoded data is copied from a differently tagged data element to the tagged data element; or encoded data is decoded by the selected at least one dynamic encoding algorithm when the encoded data is copied from the tagged data element to an untagged data element.

6. The apparatus of claim 5, wherein the encoding algorithms in the pool are injected into the program at randomly selected locations.

7. The apparatus of claim 5, wherein the encoding algorithms in the pool are randomly selected from a library of obfuscation algorithms.

8. The apparatus of claim 5, wherein the differently tagged data element is associated with a different encoding algorithm.

9. A method implemented by a processor and comprising:

tagging at least one data element when editing source code of a program while performing at least one of encoding, decoding and/or re-encoding a data flow of the program;

wherein the tagged data element is associated with a dynamic encoding algorithm randomly selected at runtime during execution of the program from a pool of encoding algorithms injected into the program at build-time, where the encoding algorithms each comprise at least one function for encoding, decoding or re-encoding data stored in the tagged data element by altering a data value without altering a data type associated with said data value; and wherein:

unencoded data is encoded by the dynamic encoding algorithm when the unencoded data is copied to the tagged data element;

encoded data is re-encoded by the dynamic encoding algorithm when the encoded data is copied from a differently tagged data element to the tagged data element; or encoded data is decoded by the dynamic encoding algorithm when the encoded data is copied from the tagged data element to an untagged data element.

10. The method of claim 9, wherein the data element is tagged in the source code of the program.

11. The method of claim 9, wherein instructions for invoking the encoding algorithm associated with the tagged data element are generated when a compiler encounters the tagged data element in the source code.

12. The method of claim 9, wherein the data element is tagged with an encoding identifier.

13. An apparatus comprising:

a processor for editing source code of a program and tagging at least one data element when performing at least one of encoding, decoding and/or re-encoding a data flow of the program, wherein the tagged data element is associated with a dynamic encoding algorithm randomly selected at runtime during execution of the program from a pool of encoding algorithms injected into the program at build-time, for encoding, where the encoding algorithms in the pool each comprise at least one function for decoding or re-encoding data stored in the tagged data element by altering a data value without altering a data type associated with said data value; and wherein:

unencoded data is encoded by the encoding algorithm when the unencoded data is copied to the tagged data element;

encoded data is re-encoded by the encoding algorithm when the encoded data is copied from a differently tagged data element to the tagged data element; or encoded data is decoded by the encoding algorithm when the encoded data is copied from the tagged data element to an untagged data element.

14. The apparatus of claim 13, wherein the data element is tagged in the source code of the program.

15. The apparatus of claim 13, wherein instructions for invoking the encoding algorithm associated with the tagged data element are generated when a compiler encounters the tagged data element in the source code.

16. The apparatus of claim 13, wherein the data element is tagged with an encoding identifier.

* * * * *